(12) United States Patent  (10) Patent No.: US 8,218,887 B2
Zyuzin  (45) Date of Patent: Jul. 10, 2012

(54) ENHANCED METHOD OF MULTILAYER COMPRESSION OF PDF (IMAGE) FILES USING OCR SYSTEMS

(75) Inventor: German Zyuzin, Moscow (RU)

(73) Assignee: ABBYY Software, Ltd., Nicosia (CY)

( * ) Notice: Subject to any disclaimer, the term of this patent is extended or adjusted under 35 U.S.C. 154(b) by 967 days.

(21) Appl. No.: 12/211,746

(22) Filed: Sep. 16, 2008

(65) Prior Publication Data

US 2009/0087112 A1  Apr. 2, 2009

Related U.S. Application Data

(60) Provisional application No. 60/976,354, filed on Sep. 28, 2007.

(51) Int. Cl.
*G06K 9/46* (2006.01)
(52) U.S. Cl. ........................ 382/243; 382/175
(58) Field of Classification Search ............... 382/162, 382/164, 166, 173, 176, 232, 235, 243, 282; 358/426.01
See application file for complete search history.

(56) References Cited

U.S. PATENT DOCUMENTS

| | | | |
|---|---|---|---|
| 5,727,112 A * | 3/1998 | Kellar et al. | 386/282 |
| 5,778,092 A | 7/1998 | MacLeod et al. | |
| 6,058,214 A | 5/2000 | Bottou et al. | |
| 6,832,007 B1 | 12/2004 | Zhang et al. | |
| 6,859,204 B2 | 2/2005 | Curry et al. | |
| 6,987,882 B2 | 1/2006 | Curry et al. | |
| 7,031,518 B2 | 4/2006 | Curry et al. | |
| 7,110,137 B2 | 9/2006 | Burgess et al. | |
| 7,139,433 B2 | 11/2006 | Li | |
| 7,308,136 B2 | 12/2007 | Curry et al. | |
| 7,376,266 B2 * | 5/2008 | Simard et al. | 382/166 |
| 7,376,272 B2 | 5/2008 | Fan et al. | |
| 7,379,593 B2 | 5/2008 | Fan et al. | |
| 7,382,489 B2 | 6/2008 | Curry et al. | |

OTHER PUBLICATIONS

L. Bottou et al., "Efficient Conversion of Digital Documents to Multilayer Raster Formats", IEEE, pp. 444-448, 2001.

* cited by examiner

*Primary Examiner* — Duy M Dang
(74) *Attorney, Agent, or Firm* — John C. Meline; LeighAnn Weiland (57) ABSTRACT

In one embodiment, the invention discloses, a method for processing a document image. The method comprises segmenting the document image into a picture component and a non-picture component; compressing the non-picture component; and saving the uncompressed picture component and the compressed non-picture component in memory so that the document image may be recomposed to form a recomposed image based on the uncompressed picture component and the compressed non-picture component.

18 Claims, 6 Drawing Sheets

Local galaxy group

The majority of galaxies[1] form groups held together by gravity. Some groups are really gargantuan in size, e.g., groups in Virgo and Berenice's Hair constellations feature thousands of galaxies stretched over some 20 million light years. Smaller galaxy groups do exist, an example is our own galaxy — the Milky Way. This group, called Local Group, comprises over some 30 galaxies stretched over some 5 million light years. The most famous galaxies of the Local Group are Milky Way, Andromeda, and M33 galaxy in the Triangulum constellation. The groups themselves form less thick groups, called supergroups. The latter are the greatest objects in the Universe, stretched over hundreds of millions of light years. The Local Group is a part of the Local Supergroup, the center of which is located in the group in Virgo constellation.

[1] *Irregular galaxies*
*The galaxies that have no regular form are called "irregular". An example is the Lesser Magellanic Cloud. The irregular galaxies are very small, much less than the Milky Way, yet they contain great amounts of gas from which new stars are formed. The Lesser Magellanic Cloud is among the nearest to the Milky Way. It can be seen in the Southern Hemisphere.*

Facts & figures

| Galaxy name | Distance (light years) | Diameter (light years) | Luminance (millions of Suns) | Type |
|---|---|---|---|---|
| Milky Way | 0 | 100 000 | 15 000 | Spiral |
| Greater Magellanic Cloud | 170 000 | 30 000 | 2 000 | Irregular Spiral |
| Lesser Magellanic Cloud | 190 000 | 20 000 | 500 | Irregular |
| Draco | 300 000 | 3 000 | 0,1 | Elliptical |
| Carina | 300 000 | 3 000 | 0,01 | Elliptical |
| Sculptor | 300 000 | 6 000 | 1 | Elliptical |
| Sextans | 300 000 | 3 000 | 0,01 | Elliptical |
| Ursa Minor | 300 000 | 2 000 | 0,1 | Elliptical |
| Fornax | 500 000 | 6 000 | 12 | Elliptical |
| Leo I | 600 000 | 2 000 | 0,6 | Elliptical |
| Leo II | 600 000 | 2 000 | 0,4 | Elliptical |
| NGC 6822 | 1 800 000 | 15 000 | 90 | Irregular |
| WLM | 2 000 000 | 6 000 | 90 | Irregular |
| Andromeda | 2 200 000 | 150 000 | 40 000 | Spiral |
| Andromeda I | 2 200 000 | 5 000 | 1 | Elliptical |
| Andromeda II | 2 200 000 | 5 000 | 1 | Elliptical |
| Andromeda III | 2 200 000 | 5 000 | 1 | Elliptical |
| M32 | 2 200 000 | 5 000 | 130 | Elliptical |
| NGC 147 | 2 200 000 | 8 000 | 50 | Elliptical |
| NGC 185 | 2 200 000 | 8 000 | 60 | Elliptical |
| NGC 205 | 2 200 000 | 11 000 | 160 | Elliptical |
| M33 | 2 400 000 | 40 000 | 5 000 | Spiral |
| DDO 210 | 3 000 000 | 5 000 | 2 | Irregular |
| Pisces | 3 000 000 | 2 000 | 0,6 | Irregular |
| GR 8 | 4 000 000 | 1 500 | 2 | Irregular |
| Sagittarius | 4 000 000 | 4 000 | 1 | Irregular |
| Pegasus | 5 000 000 | 7 000 | 20 | Irregular |
| Leo A | 5 000 000 | 7 000 | 20 | Irregular |

*Elliptical galaxies*
*Elliptical galaxies are very few in number in the Local Group, and are only poorly visible. An example is the M87 galaxy from the Virgo Group. It is a big ball made of more than a thousand billion old red stars and a few novas. The stars always move in the same direction in an elliptical galaxy.*

*Crossed spiral galaxies*
*NGC1365, part of the Fornax group, is a spiral galaxy with a short "bridge" comprised of older stars. The ends of bridge feature arms. Such spiral is called a bridge. The bridge rotates as if it were a solid body; however, it is made from millions of separate stars. It is possible that the Milky Way is also such a galaxy.*

Figure 4

Local galaxy group

The majority of galaxies[1] form groups held together by gravity. Some groups are really gargantuan in size, e.g., groups in Virgo and Berenice's Hair constellations feature thousands of galaxies stretched over some 20 million light years. Smaller galaxy groups do exist, an example is our own galaxy — the Milky Way. This group, called Local Group, comprises some 30 galaxies stretched over some 5 million light years. The most famous galaxies of the Local Group are Milky Way, Andromeda, and M33 galaxy in the Triangulum constellation. The groups themselves form less thick groups, called supergroups. The latter are the greatest objects in the Universe, stretched over hundreds of millions of light years. The Local Group is a part of the Local Supergroup, the center of which is located in the group in Virgo constellation.

Facts & figures

| Galaxy name | Distance (light years) | Diameter (light years) | Luminance (millions of Suns) | Type |
|---|---|---|---|---|
| Milky Way | 0 | 100 000 | 15 000 | Spiral |
| Greater Magellanic Cloud | 170 000 | 30 000 | 2 000 | Irregular Spiral |
| Lesser Magellanic Cloud | 190 000 | 20 000 | 500 | Irregular |
| Draco | 300 000 | 3 000 | 0,1 | Elliptical |
| Carina | 300 000 | 3 000 | 0,01 | Elliptical |
| Sculptor | 300 000 | 6 000 | 1 | Elliptical |
| Sextans | 300 000 | 3 000 | 0,01 | Elliptical |
| Ursa Minor | 300 000 | 2 000 | 0,1 | Elliptical |
| Fornax | 500 000 | 6 000 | 12 | Elliptical |
| Leo I | 600 000 | 2 000 | 0,6 | Elliptical |
| Leo II | 600 000 | 2 000 | 0,4 | Elliptical |
| NGC 6822 | 1 800 000 | 15 000 | 90 | Irregular |
| WLM | 2 000 000 | 6 000 | 90 | Irregular |
| Andromeda | 2 200 000 | 150 000 | 40 000 | Spiral |
| Andromeda I | 2 200 000 | 5 000 | 1 | Elliptical |
| Andromeda II | 2 200 000 | 5 000 | 1 | Elliptical |
| Andromeda III | 2 200 000 | 5 000 | 1 | Elliptical |
| M32 | 2 200 000 | 5 000 | 130 | Elliptical |
| NGC 147 | 2 200 000 | 8 000 | 50 | Elliptical |
| NGC 185 | 2 200 000 | 8 000 | 60 | Elliptical |
| NGC 205 | 2 200 000 | 11 000 | 160 | Elliptical |
| M33 | 2 400 000 | 40 000 | 5 000 | Spiral |
| DDO 210 | 3 000 000 | 5 000 | 2 | Irregular |
| Pisces | 3 000 000 | 2 000 | 0,6 | Irregular |
| GR 8 | 4 000 000 | 1 500 | 2 | Irregular |
| Sagittarius | 4 000 000 | 4 000 | 1 | Irregular |
| Pegasus | 5 000 000 | 7 000 | 20 | Irregular |
| Leo A | 5 000 000 | 7 000 | 20 | Irregular |

[1] *Irregular galaxies*
The galaxies that have no regular form are called "irregular". An example is the Lesser Magellanic Cloud. The irregular galaxies are very small, much less than the Milky Way, yet they contain great amounts of gas from which new stars are formed. The Lesser Magellanic Cloud is among the nearest to the Milky Way, it can be seen in the Southern Hemisphere.

*Elliptical galaxies*
Elliptical galaxies are very few in number in the Local Group, and are only poorly visible. An example is the M87 galaxy from the Virgo Group. It is a big ball made of more than a thousand billion old red stars and a few novas. The stars always move in the same direction in an elliptical galaxy.

*Crossed spiral galaxies*
NGC1365, part of the Fornax group, is a spiral galaxy with a short "bridge" comprised of older stars. The ends of bridge feature arms. Such spiral is called a bridge. The bridge rotates as if it were a solid body, however, it is made from millions of separate stars. It is possible that the Milky Way is also such a galaxy.

ENHANCED METHOD OF MULTILAYER COMPRESSION OF PDF (IMAGE) FILES USING OCR SYSTEMS

This application claims the benefit of priority to U.S. Provisional Patent Application No. 60/976,354, filed 28 Sep. 2007, the specification of which is hereby incorporated by reference.

FIELD

Embodiments of the present invention relate to an implementation of a method and system for Optical Character Recognition (OCR).

BACKGROUND

OCR systems are used to transform paper documents, images of such documents, or Portable Document Format (PDF) files into computer-readable/computer-editable and searchable electronic form or files. A typical OCR system consists of an imaging device that produces the image of a document and software that runs on a computer that processes the images. As a rule, this software includes an OCR program, which can recognize symbols, letters, characters, digits, and other units and save them into a computer-editable format.

However, apart from text, a document image may contain pictures, which lose their quality if saved together with the text using traditional methods. If lossless methods are used to save the pictures, the size of the resulting file becomes unacceptably large. To avoid this dilemma, a multilayer compression method is sometimes used known as Mixed Raster Content (MRC). The MRC method uses three-layer compression so that one algorithm is used to compress the background, another algorithm is used to compress the chromatic units, and still another method may be used to compress the monochrome mask. This method will in most cases yield files of acceptable sizes. However, sometimes a user may need certain important elements, including, among other, pictures and photos, to be saved in PDF format without any noticeable loss in quality.

SUMMARY

In one embodiment, the invention discloses, a method for processing a document image. The method comprises segmenting the document image into a picture component and a non-picture component; compressing the non-picture component; and saving the uncompressed picture component and the compressed non-picture component in memory so that the document image may be recomposed to form a recomposed image based on the uncompressed picture component and the compressed non-picture component.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings, wherein:

FIG. 4A is an illustration for the method of the present invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the invention disclose a method to efficiently reduce the size of "image only" and "searchable" PDF files at the same time maintaining the high visual quality of the document. The method includes the following broad steps:

segmenting a document image into a picture component and a non-picture component;

compressing the non-picture component; and saving the uncompressed picture component and the compressed non-picture component in memory so that the document image may be recomposed to form a recomposed image based on the uncompressed picture component and the compressed non-picture component.

The method may be implemented by a data capture system which includes an imaging device connected to a computer with specially designed OCR software. When a paper document is scanned which contains text printed in several font types, several different blocks or areas of text, tables, blocks, areas of text in different colors, pictures, photos, etc, the OCR system analyzes and classifies each block or area as containing pictures or photos, or text printed in a particular font type and color.

The method is based on analyzing the chromaticity of image content. Based on chromaticity change, images may be classified in at least two categories:

pictures (or photos) where chromaticity changes smoothly and gradually from a dark color to a light color, and text and tables where chromaticity changes in discrete blocks, without a smooth transitions between light and dark areas.

Figure 1:
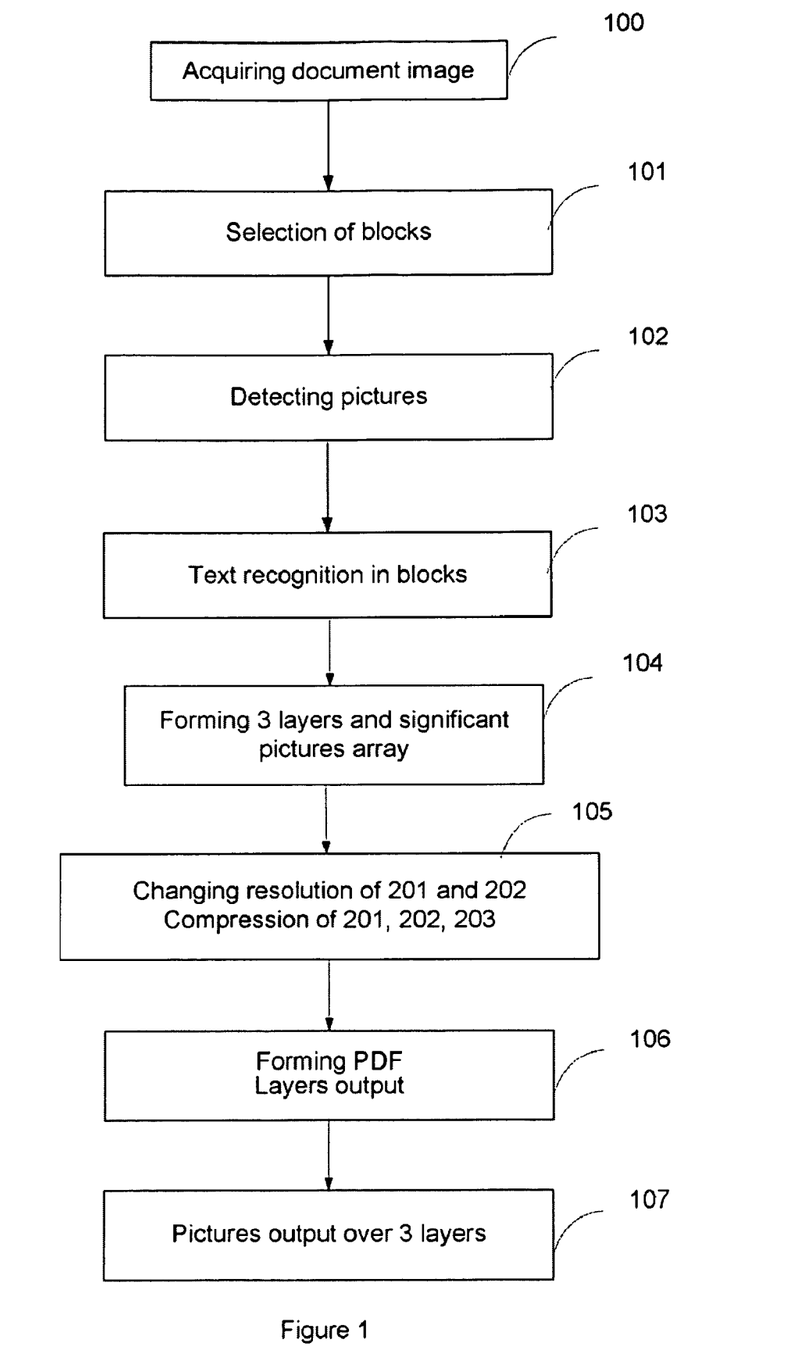
FIG. 1 shows a flowchart for method of compressing a document, in accordance with one embodiment of the invention.

In one embodiment, different export modes for exporting "significant" pictures and all other image elements is used. FIG. 1 of the drawings shows an image processing diagram. Referring to FIG. 1, at block 100 a document image is acquired, e.g. from an imaging device. At block 101, blocks in the image are selected. A block may comprise text, or pictures etc.

At block 102, pictures are detected in the image. In one embodiment, this may be done automatically with the help of an OCR program which can detect pictures by distinguishing them from the text and cutting them out from the image. In another embodiment, this may be done manually by the user. In this case, the user can manually specify the "significant" pictures and select a compression ratio for the pictures. At block 103, the text in textual blocks is recognized by means of OCR.

Figure 2:
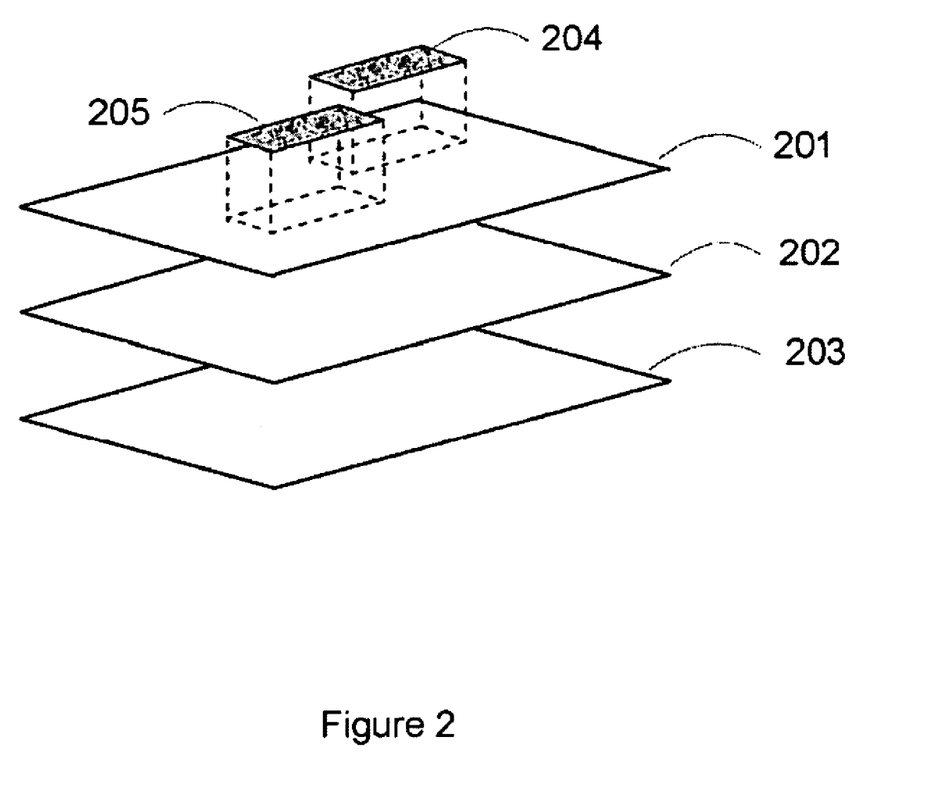
FIG. 2 is an illustration for the three-layers of an image after cutting out significant pictures.
Figure 3:
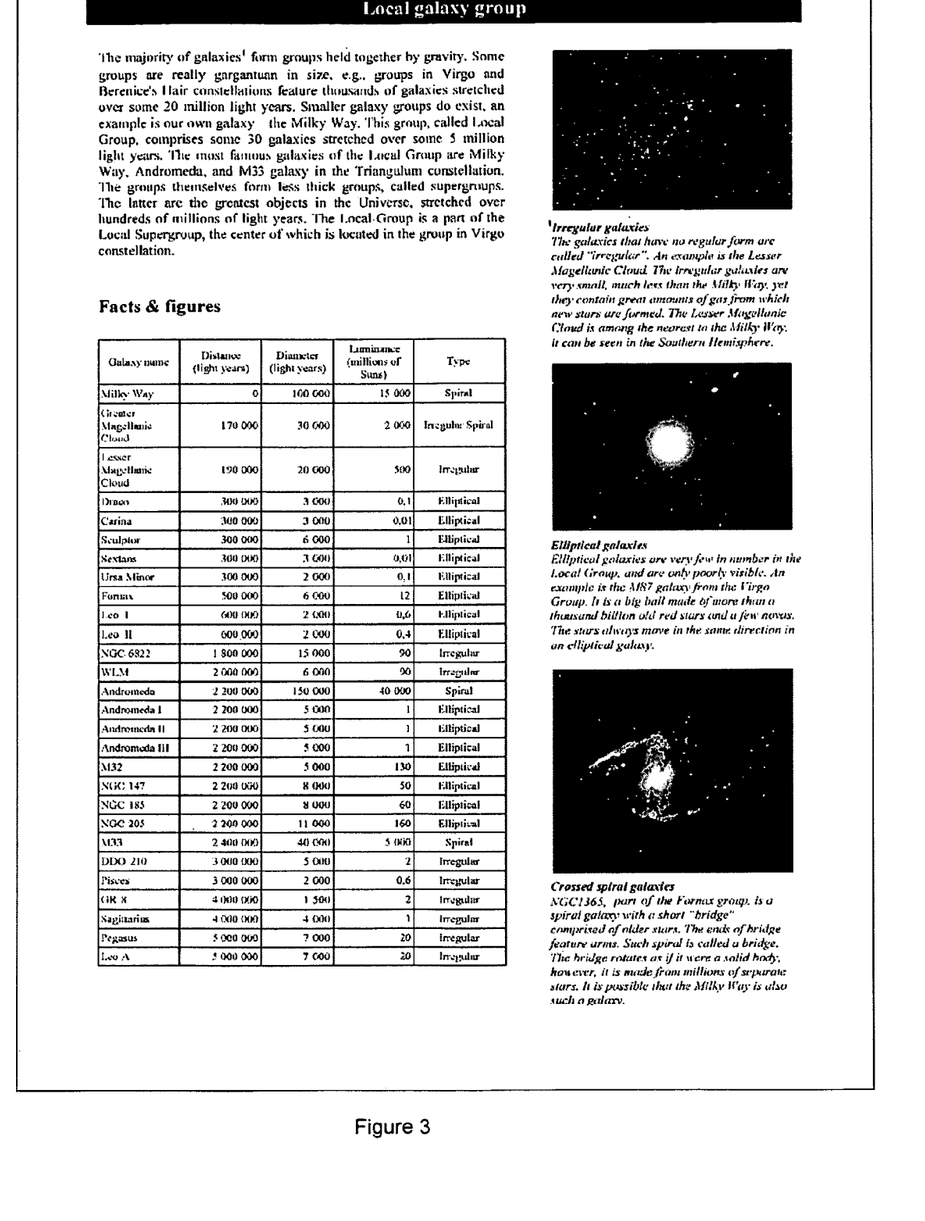
FIG. 3 shows examples of images for which the method of the invention can be effectively used.

At block 104, the image with the pictures removed or cut-out comprising blocks of text, tables, and other units of the image where chromaticity changes in discrete blocks is divided into three layers. FIG. 2 illustrates these three layers, in accordance with one embodiment of the invention. As will be seen, the three layers comprise a background layer 201, a chromatic layer 202, and layer 203 representing a monochrome mask. In FIG. 2, reference numerals 204 and 205 represent the "significant" pictures that were removed FIG. 3 shows an example of an image for which the method of the invention can be effectively used. The image is characterized by the presence of pictures which may be considered, apart from the text blocks, as "significant."

Figure 4:
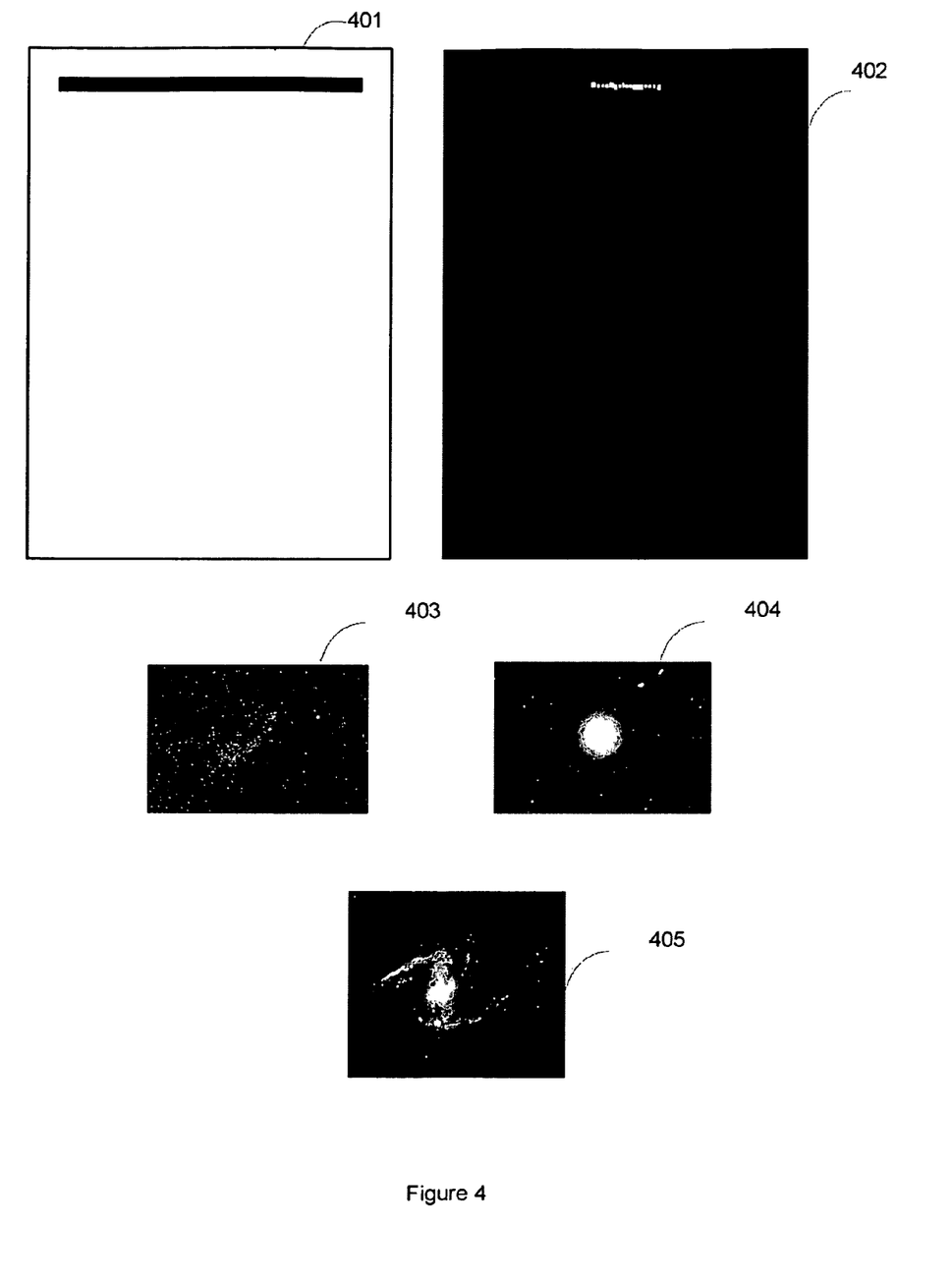
FIG. 4 is an illustration for the method of the present invention.

FIG. 4 shows how the image of FIG. 3 may be separated or decomposed into background 401, chromatic layer 402 and "significant" pictures 403, 404 and 405, in accordance with the techniques disclosed herein. FIG. 4A shows examples of a monochrome mask that may be used to reconstruct the image of FIG. 3 based on the background 401, chromatic layer 402, and pictures 403, 404, and 405.

In accordance with one embodiment, the background layer 201 is constructed to contain only a background color for each block in an image. Each block may be represented on the background layer 201 as a color rectangle, for example, with smooth color transitions, possibly with a texture and/or watermarks. For example, if the text block is "inverted", such as the title of the image of FIG. 3, this block is represented on the FIG. 4 by a black rectangle on the background layer 401. The background is considered the least important of all elements to the user and may be freely compressed using a lossy compression method, such as JPEG. In one embodiment, the user can select a compression ratio for the background.

In one embodiment, the chromatic layer 202 is constructed by substituting a spatially corresponding rectangle for each character (i.e. letter or symbol) in the image being processed, the rectangle being of the same color of the character. Moreover, each rectangle has such a size to hold the corresponding character. The main color of chromatic layer 402 in FIG. 4 is black because the main color of the text is black, and the "inverted" title letters are represented by white rectangles in the chromatic layer 402. In one embodiment, if the color of a letter cannot be detected, the rectangle is given the color of its environment, e.g. the most frequently occurring color of the letters in the string. Any method may be used to compress this layer, e.g. ZIP or LZW compression.

The layer 203 represents a monochrome mask whose units may be "0" and "1", and which acts as a switch to control when a pixel in the recomposed image will be rendered based on the background and chromatic layers. In one embodiment a "1" corresponds to a black colored pixel in the source image, whereas a "0" corresponds to a pixel of any other color and which may be rendered based on the background layer 201 and the chromatic layer 202. FIG. 4A represents an example of monochome mask for the image of FIG. 3. Any method suitable for binary files may be used for compressing the layer 303, e.g. CCITT4 FAX compression.

Referring to FIG. 1, at block 105 to reduce an output file size, a resolution of the background layer 201 and the chromatic layer 202 is lowered, and all three layers are compressed.

Referring to FIG. 1, at block 106, a PDF file is formed and stored in memory. The PDF file structure is formed in such a manner that first the background 201 is exported. Then, the result of superimposing the monochrome mask 203 on the chromatic layer 202 is placed over the background 301.

Finally, at block 107, the "significant" pictures are exported and placed over all said images.

Figure 5:
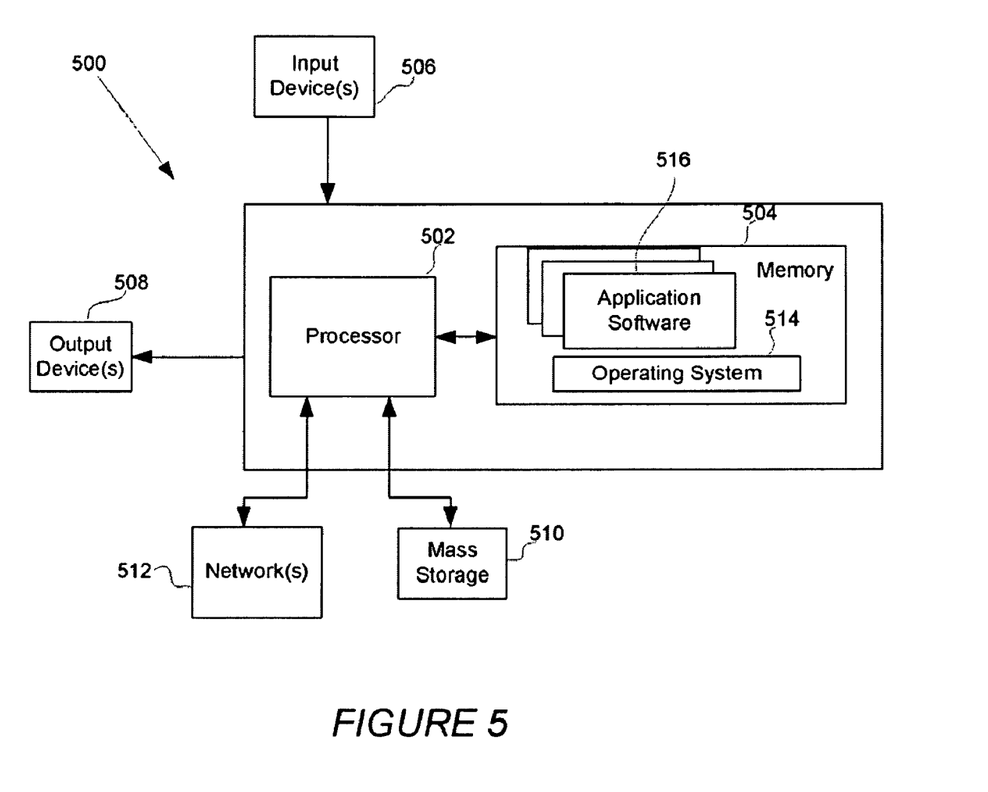
FIG. 5 shows a block diagram of hardware for an OCR system, in accordance with one embodiment of the invention.

FIG. 5 of the drawings shows an example of hardware 500 that may be used to implement the data capture system, in accordance with one embodiment of the invention. The hardware 500 typically includes at least one processor 502 coupled to a memory 504. The processor 502 may represent one or more processors (e.g., microprocessors), and the memory 504 may represent random access memory (RAM) devices comprising a main storage of the hardware 500, as well as any supplemental levels of memory e.g., cache memories, non-volatile or back-up memories (e.g. programmable or flash memories), read-only memories, etc. In addition, the memory 504 may be considered to include memory storage physically located elsewhere in the hardware 500, e.g. any cache memory in the processor 502 as well as any storage capacity used as a virtual memory, e.g., as stored on a mass storage device 510.

The hardware 500 also typically receives a number of inputs and outputs for communicating information externally. For interface with a user or operator, the hardware 500 may include one or more user input devices 506 (e.g., a keyboard, a mouse, imaging device, scanner, etc.) and a one or more output devices 508 (e.g., a Liquid Crystal Display (LCD) panel, a sound playback device (speaker)).

For additional storage, the hardware 500 may also include one or more mass storage devices 510, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 500 may include an interface with one or more networks 512 (e.g., a local area network (LAN), a wide area network (WAN), a wireless network, and/or the Internet among others) to permit the communication of information with other computers coupled to the networks. It should be appreciated that the hardware 500 typically includes suitable analog and/or digital interfaces between the processor 502 and each of the components 504, 506, 508, and 512 as is well known in the art.

The hardware 500 operates under the control of an operating system 514, and executes various computer software applications, components, programs, objects, modules, etc. to implement the techniques described above. Moreover, various applications, components, programs, objects, etc., collectively indicated by reference 516 in FIG. 5, may also execute on one or more processors in another computer coupled to the hardware 500 via a network 512, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks, (DVDs), etc.), among others, and transmission type media such as digital and analog communication links.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

The invention claimed is:

1. A method for processing a document image, the method comprising:
    segmenting the document image into a picture component and a non-picture component;
    from the non-picture component, constructing a background layer, a chromatic layer and a monochrome mask for the non-picture component, wherein the chromatic layer is constructed by substituting a spatially corresponding rectangle for each character in the non-picture component;
    compressing the non-picture component; and
    saving the uncompressed picture component and the compressed non-picture component in memory so that the document image forms a recomposed image based on the uncompressed picture component and the compressed non-picture component.

2. The method of claim 1, wherein the method further comprises identifying one or more blocks in the non-picture component after segmenting the document image into the picture component and the non-picture component, wherein the background layer comprises a background color for each block in the non-picture component.

3. The method of claim 1, wherein the monochrome mask acts as a switch to control when a pixel in the recomposed image would be rendered based on the background and chromatic layers.

4. The method of claim 1, wherein segmenting the document image into the picture component comprises identifying each picture in the document image based on one or more chromaticity changes.

5. The method of claim 4, wherein said identifying is performed automatically.

6. The method of claim 4, wherein said identifying is performed manually.

7. The method of claim 1, wherein the spatially corresponding rectangle for each character in the non-picture component is created with a same color as found in the respective character.

8. The method of claim 1, wherein the characters of the non-picture component of the document image are constructed in the chromatic layer.

9. A system comprising:
    a processor; and
    a memory coupled to the processor, the memory storing instructions which when executed by the processor cause the system to perform a method for processing an image document, the method comprising:
        segmenting the document image into a picture component and a non-picture component;
        from the non picture component constructing a background layer, a chromatic layer and a monochrome mask for the non-picture component, wherein the chromatic layer is constructed by substituting a spatially corresponding rectangle for each character in the non-picture component;
        compressing the non-picture component; and
        saving the uncompressed picture component and the compressed non-picture component in memory so that the document image forms a recomposed on the uncompressed picture component and the compressed non-picture component.

10. The system of claim 9, wherein the method further comprises identifying one or more blocks in the non-picture component after segmenting the document image into the picture component and the non-picture component, wherein the background layer comprises a background color for each block in the non-picture component.

11. The system of claim you 10, wherein the monochrome mask acts as a switch to control when a pixel in the recomposed image would be rendered based on the background and chromatic layers.

12. The system of claim 9, wherein segmenting the document image into the picture component comprises identifying each picture in the document image based on one or more chromaticity changes.

13. The system of claim 9, wherein the spatially corresponding rectangle for each character in the non-picture component is created with a same color as found in the respective character.

14. A non-transitory computer-readable medium having stored thereon a sequence of instructions which when executed by a computer, cause the computer to perform a method for processing a document image, the method comprising:
    segmenting the document image into a picture component and a non-picture component;
    from the non-picture component, constructing a background layer, a chromatic layer and a monochrome mask for the non-picture component, wherein the chromatic layer is constructed by substituting a spatially corresponding rectangle for each character in the non-picture component;
    compressing the non-picture component; and
    saving the uncompressed picture component and the compressed non-picture component in memory so that the document image forms a recomposed image based on the uncompressed picture component and the compressed non-picture component.

15. The non-transitory computer-readable medium of claim 14, wherein the background layer comprises a background color for each block in the non-picture component.

16. The non-transitory computer-readable medium of claim 14, wherein the monochrome mask acts as a switch to control when a pixel in the recomposed image would be rendered based on the background and chromatic layers.

17. The non-transitory computer-readable medium of claim 14, segmenting the document image into the picture component comprises identifying each picture in the document image based on one or more chromaticity changes.

18. The non-transitory computer-readable medium of claim 14, wherein the spatially corresponding rectangle for each character in the non-picture component is created with a same color as found in the respective character.

* * * * *